United States Patent
Ll et al.

(10) Patent No.: US 9,628,461 B2
(45) Date of Patent: Apr. 18, 2017

(54) METHOD AND DEVICE FOR IDENTITY AUTHENTICATION

(71) Applicant: Huawei Technologies Co., Ltd., Shenzhen, Guangdong (CN)

(72) Inventors: Li Ll, Guangdong (CN); Lixin Hu, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 145 days.

(21) Appl. No.: 14/409,300

(22) Filed: Dec. 18, 2014

(65) Prior Publication Data
US 2015/0106882 A1    Apr. 16, 2015

Related U.S. Application Data

(63) Continuation of application No. PCT/CN2012/077939, filed on Jun. 29, 2012.

(51) Int. Cl.
*G06F 21/33* (2013.01)
*H04L 29/06* (2006.01)
(Continued)

(52) U.S. Cl.
CPC ........ *H04L 63/08* (2013.01); *G06F 17/30905* (2013.01); *G06F 21/335* (2013.01); *H04L 9/3263* (2013.01); *H04L 63/0823* (2013.01)

(58) Field of Classification Search
CPC .. G06F 21/335; H04L 63/0823; H04L 9/3263
See application file for complete search history.

(56) References Cited

U.S. PATENT DOCUMENTS

| 7,752,448 B1 | 7/2010 | Badenell |
| 2008/0189778 A1 | 8/2008 | Rowley |

(Continued)

FOREIGN PATENT DOCUMENTS

| CN | 1556449 A | 12/2004 |
| CN | 1787513 A | 6/2006 |
| CN | 101610157 A | 12/2009 |

OTHER PUBLICATIONS

Dietz et al., "Origin-Bound Certificates: A Fresh Approach to Strong Client Authentication for the Web", 2012, 15 pages.*

(Continued)

*Primary Examiner* — Thanhnga B Truong
*Assistant Examiner* — Thaddeus Plecha
(74) *Attorney, Agent, or Firm* — Leydig, Voit & Mayer, Ltd.

(57) ABSTRACT

Embodiments of the present invention provide a method and a device for identity authentication. The method for identity authentication includes: according to a selected user digital certificate, generating, by a browser kernel unit, a login request carrying a selected user digital certificate according to the selected user digital certificate, and sending the login request to an application server; receiving, by the browser kernel unit, a response indicating authentication success which is returned by the application server after performing identity authentication according to the selected digital certificate, extracting a webpage file from the response, parsing the webpage file, generating a webpage and sending the webpage to a browser interface unit; and displaying, by the browser interface unit, the webpage. The method and the device for identity authentication provided by embodiments of the present invention improve the convenience and security of identity authentication.

8 Claims, 10 Drawing Sheets

(51) Int. Cl.
*H04L 9/32* (2006.01)
*G06F 17/30* (2006.01)

(56) References Cited

U.S. PATENT DOCUMENTS

| | | | | |
|---|---|---|---|---|
| 2009/0165109 | A1* | 6/2009 | Hird | G06F 21/33 |
| | | | | 726/7 |
| 2010/0199099 | A1* | 8/2010 | Wu | H04L 9/0894 |
| | | | | 713/182 |
| 2011/0153867 | A1* | 6/2011 | van de Ven | H04L 29/12811 |
| | | | | 709/245 |
| 2012/0047554 | A1* | 2/2012 | Mihara | G06F 21/6245 |
| | | | | 726/1 |
| 2015/0326564 | A1* | 11/2015 | Wang | G06Q 40/02 |
| | | | | 726/6 |

OTHER PUBLICATIONS

Sporny et al., "WebID 1.0; Web Identification and Discovery," W3C Editor's Draft, World Wide Web Consortium, Cambridge, Massachusetts (Nov. 29, 2011).

* cited by examiner

METHOD AND DEVICE FOR IDENTITY AUTHENTICATION

CROSS-REFERENCE TO RELATED APPLICATIONS

This application is a continuation of International Patent Application No. PCT/CN2012/077939, filed on Jun. 29, 2012, which is hereby incorporated by reference in its entirety.

TECHNICAL FIELD

Embodiments of the present invention relate to network techniques and, in particular, to a method and a device for identity authentication.

BACKGROUND

Web (webpage) application is an application program which is wrote by using a language supported by the browser and takes the browser as operating and presenting environments. When a user uses a Web application, in order to ensure the security of usage of network system resources, performing an identity authentication on the user is usually needed, so that a legitimate user accesses network system resources with a legitimate authority.

In the prior art, generally, the identity authentication of a user is performed by using a username and a password input by the user, the user needs to remember the username and the password, moreover, the password is easy to be intercepted by a third party during a transmission process, the security is not high, and inputting the password is relative troublesome and not convenient enough.

SUMMARY

Embodiments of the present invention provide a method and a device for identity authentication, so as to improve the convenience and security of the identity authentication.

Embodiments of the present invention provide a method for identity authentication, including:

generating, by a browser kernel unit, a login request carrying a selected user digital certificate according to the selected user digital certificate, and sending the login request to an application server;

receiving, by the browser kernel unit, a response indicating authentication success which is returned by the application server after performing identity authentication according to the selected digital certificate, extracting a webpage file from the response, parsing the webpage file, generating a webpage and sending the webpage to a browser interface unit; and;

displaying, by the browser interface unit, the webpage.

Embodiments of the present invention provide a device for identity authentication, including:

a browser kernel unit and a browser interface unit;

the browser kernel unit is configured to, generate a login request carrying a selected user digital certificate according to the selected user digital certificate, send the login request to an application server, receive a response indicating authentication success which is returned by the application server after performing identity authentication according to the selected digital certificate, extract a webpage file from the response, parse the webpage file, generate a webpage and send the webpage to a browser interface unit;

the browser interface unit is configured to display the webpage.

As seen from the foregoing technical solutions, according to the identity authentication method provided by this embodiment, a browser kernel unit generates a login request carrying a selected user digital certificate according to the selected user digital certificate, sends the login request to an application server; the browser kernel unit receives a response for indicating authentication success sent by the application server, extracts a webpage file from the response, parses the webpage file, generates a webpage and sends the webpage to a browser interface unit; the browser interface unit displays the webpage. The identity authentication is performed through the user digital user certificate, a user does not need to remember a username and a password, thereby avoiding the interception of the password during a transmission process, and improving the convenience and security of the identity authentication.

BRIEF DESCRIPTION OF DRAWINGS

In order to make the technical solutions in embodiments of the present invention or in the prior art more clearly, the accompanying drawings used in the description of the embodiments or the prior art will be briefly described hereunder. Obviously, the described drawings are merely some embodiments of present invention. For persons skilled in the art, other drawings may be obtained based on these drawings without any creative effort.

DESCRIPTION OF EMBODIMENTS

In order to make the objectives, technical solutions, and advantages of embodiments of the present invention more clearly, the technical solutions in embodiments of the present invention are hereinafter described clearly and completely with reference to the accompanying drawings in embodiments of the present invention. Obviously, the described embodiments are only a part of embodiments of the present invention, rather than all the embodiments of the present invention. All the other embodiments obtained by persons of ordinary skill in the art based on embodiments of the present invention without any creative efforts shall fall within the protection scope of the present invention.

Figure 1:
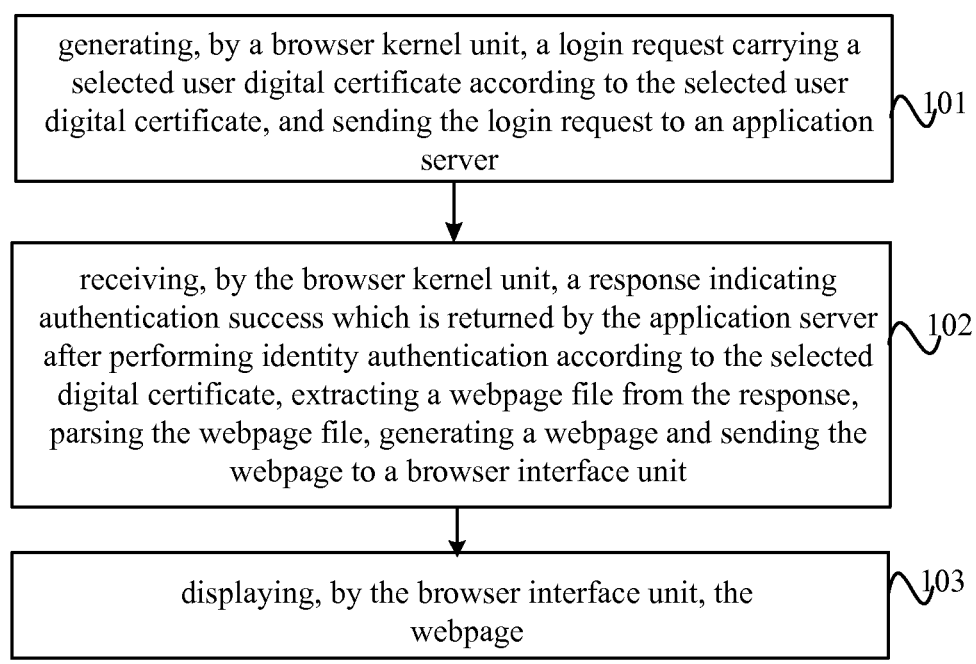
FIG. 1 is a flow chart of a first method for identity authentication according to an embodiment of the present invention.

FIG. 1 is a flow chart of a first method for identity authentication according to an embodiment of the present invention. As shown in FIG. 1, the method for identity authentication according to this embodiment of the present invention may be specifically applied to a user identity authentication process when the user uses a Web application through a browser, and may be executed through a device for identity authentication provided with a browser. The device for identity authentication may be a device such as a personal computer, a notebook, a flat-panel computer and a smart phone.

The method for identity authentication according to this embodiment specifically includes:

step 101, generating, by a browser kernel unit, a login request carrying a selected user digital certificate according to the selected user digital certificate, and sending the login request to an application server;

step 102, receiving, by the browser kernel unit, a response indicating authentication success which is returned by the application server after performing identity authentication according to the selected digital certificate, extracting a webpage file from the response, parsing the webpage file, generating a webpage and sending the webpage to a browser interface unit; and step 103, displaying, by the browser interface unit, the webpage.

Specifically, a user registers to be a legitimate user of a Web application firstly, the Web application distributes a corresponding user digital certificate to a client of the user, where the which is stored in an identity authentication device. Specifically, the user digital certificate may utilize a public key system, i.e., utilize a pair of keys matched with each other for encryption and decryption. During a process of network transmission, only a public key will be transmitted, and a private key is only locally stored in the user. Therefore, even if the user digital certificate is intercepted, the user digital certificate will not be decrypted and the real data of the user digital certificated cannot be acquired. When the user performs the registration through a plurality of user identities, each of the user identities will has its own corresponding user digital certificate, where a WebID (an identity of a user in a webpage) may be used to identify the user identity so as to achieve the uniqueness of the user identity. The user digital certificate may include information such as a WebID, a certificate issuer, a certificate type, a certificate public key and a digital signature algorithm. When a user needs to login with a certain user identity, a user digital certificate corresponding to the user identity may be selected, at this time, the user digital certificate corresponding to the user identity selected by the user is namely the selected user digital certificate.

The browser kernel unit is specifically provided with a browser kernel program, the browser kernel unit generates a login request carrying the selected user digital certificate according to the selected user digital certificate, the login request is used for indicating a request for performing a login processing for the user identity corresponding to the user digital certificate, where the login request is specifically a HTTP (HyperText Transfer Protocol, hypertext transfer protocol) GET (get) request. The browser kernel unit sends the login request to an application server corresponding to the Web application, where the application server receives the login request and validates the user digital certificate in the login request.

Specifically, the method for validating the user digital certificate by the application server may include the following two types:

one implementation method: the application server may initiate a query request to a corresponding authentication server via a SPARQL (Simple Protocol and RDF Query Language) manner, where the query request may carry several key parameters in the user digital certificate, for example, a WebID, a certificate type, a certificate public key, etc., the authentication server performs a query according to the above several key parameters, when parameters of a certain user digital certificate stored in the authentication server all are the same with the several key parameters carried during the above query process, then the query result is true, the identity authentication succeeds; when parameters of a certain user digital certificate stored in the authentication server are totally different from or not completely the same with the several key parameters carried during the above query process, the identity authentication fails.

The other implementation method: the application server acquires a user digital certificate corresponding to the WebID stored in the authentication server via a HTTPS (Hypertext Transfer Protocol over Secure Socket Layer, a HTTP message which is securely transmitted) GET request. The application server matches a user digital certificate carried in a received login request with the user digital certificate acquired from the authentication server, if parameters of the two user digital certificates all are the same, i.e., the match succeeds, then the user identity authentication succeeds, if parameters of the two user digital certificates are totally different or not completely the same, then the identity authentication fails.

If the user identity authentication succeeds, then a response for indicating the authentication success is sent to the browser kernel unit, where the response carries a web file corresponding to the Web application, and the response indicating the authentication success may specifically be a HTTP 200 response. The browser kernel unit extracts a web file from the response, parses the web file, executes the web file, performs a corresponding rendering, and displays the final webpage through a browser interface unit, so as to provide a corresponding Web application to the user. The webpage file may specifically include a hypertext markup language (Hypertext Markup Language, briefly as HTML) file, a javascript script file and a cascading style sheet (Cascading Style Sheet, briefly as CSS) file, etc. The browser interface unit is provided with a browser interface program. When the user identity authentication fails, the application server also returns a response for indicating the authentication failure to the browser kernel unit, where the response indicating authentication failure may specifically be a HTTP 403 response.

According to the identity authentication method provided by this embodiment, a browser kernel unit generates a login request carrying a selected user digital certificate according to the selected user digital certificate, sends the login request to an application server; the browser kernel unit receives a response for indicating authentication success sent by the application server, extracts a webpage file from the response, parses the webpage file, generates a webpage and sends the webpage to a browser interface unit; the browser interface unit displays the webpage. The identity authentication is performed through the user digital user certificate, a user does not need to remember a username and a password, thereby avoiding the interception of the password during a transmission process, and improving the convenience and security of the identity authentication.

Figure 2:
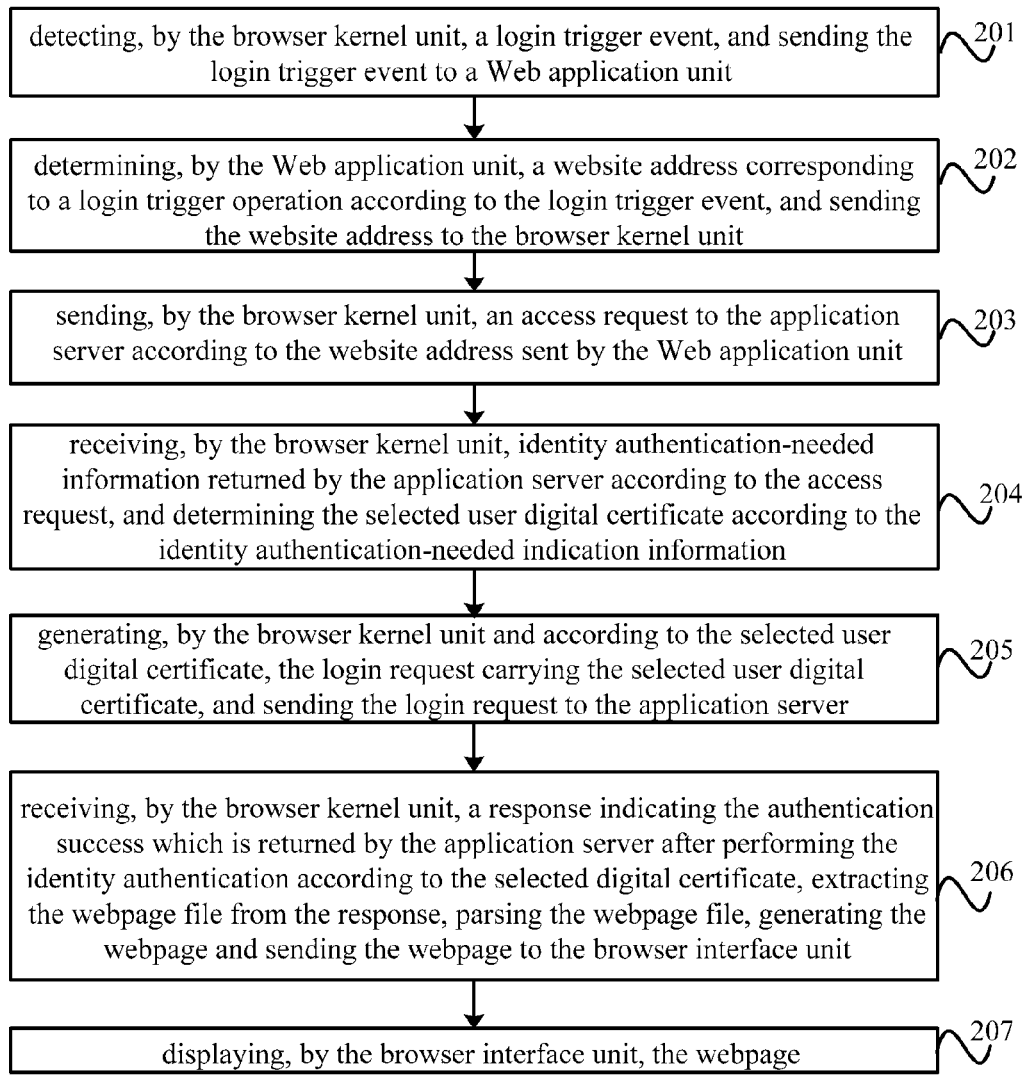
FIG. 2 is a flow chart of a second method for identity authentication according to an embodiment of the present invention.

FIG. 2 is a flow chart of a second method for identity authentication according to an embodiment of the present invention. As shown in FIG. 2, in this embodiment, in Step 101 of the embodiment as shown in FIG. 1, before the generating, by the browser kernel unit, the login request carrying the selected user digital certificate according to the selected user digital certificate, the method may further include the following steps:

Step 201, detecting, by the browser kernel unit, a login trigger event, and sending the login trigger event to a Web application unit;

Step 202, determining, by the Web application unit, a website address corresponding to a login trigger operation according to the login trigger event, and sending the website address to the browser kernel unit;

Step 203, sending, by the browser kernel unit, an access request to the application server according to the website address sent by the Web application unit;

Step 204, receiving, by the browser kernel unit, identity authentication-needed information returned by the application server according to the access request, and determining the selected user digital certificate according to the identity authentication-needed indication information.

Specifically, the Web application unit is provided with a Web application. In an application scenario, when a user uses the Web application through a browser, if the accessed network resources do not need identity authentication, the user does not need to login. If the network resources accessed by the user need identity authentication, then providing a user digital certificate by the user is needed, so as to perform the identity authentication.

The login trigger event is specifically an event triggering a login operation, for example, when the user clicks on a text, a button, or a picture which includes a hyperlink on the webpage displayed by the browser interface unit, a user click event will be generated, where the click event specifically carrying an identification of the text, the button, or the picture clicked by the user, the browser interface unit reports the user click event to the browser kernel unit, the user click event may serve as the login trigger event, at this time, the trigger login operation may be a click operation, the website address corresponding to the trigger login operation may be the website address linked to the click operation. The login trigger event may also be a webpage automatically forwarding, playing a video to a certain length, or performing a copy operation by a user, etc. When the browser kernel unit detects the login trigger event, the browser kernel unit sends the login trigger event to the Web application unit. The Web application unit determines a website address corresponding to the login trigger operation according to the login trigger event, and sends the website address to the browser kernel unit, the browser kernel unit generates an access request carrying the website address and sends the access request to the application server. The access request may specifically be a HTTP GET request. The application server determines the security, importance and privacy of the network resources accessed by the user according to the access request, if it is judged that the network resources that the user requests to access need the identity authenticate of the user, then sends the identity authentication-needed indication information to the browser kernel unit. The browser kernel unit determines the selected user digital certificate according to the identity authentication-needed indication information.

The identity authentication-needed indication information may also carry an identity authentication defining parameter, where the identity authentication constraint parameter may include the following:

Issuer: an issuing authority, i.e., a certificate issuer;

Certificate_types: a certificate type, which may be an RSA key (RSA public key encryption algorithm), a DSA key (Digital Signature Algorithm key, DSA public key encryption algorithm), an RSA static DH (RSA static Diffie-Hellman public key encryption algorithm) key, or a DSA static DH key (DSA static Diffie-Hellman public key encryption algorithm);

Signature Algorithm: a signature algorithm;

Public Key Algorithm: a public key algorithm.

The browser kernel unit may perform a screening to user digital certificates according to the identity authentication constraint parameter, so as to determine a user digital certificate which tally with the identity authentication constraint parameter.

Figure 3:
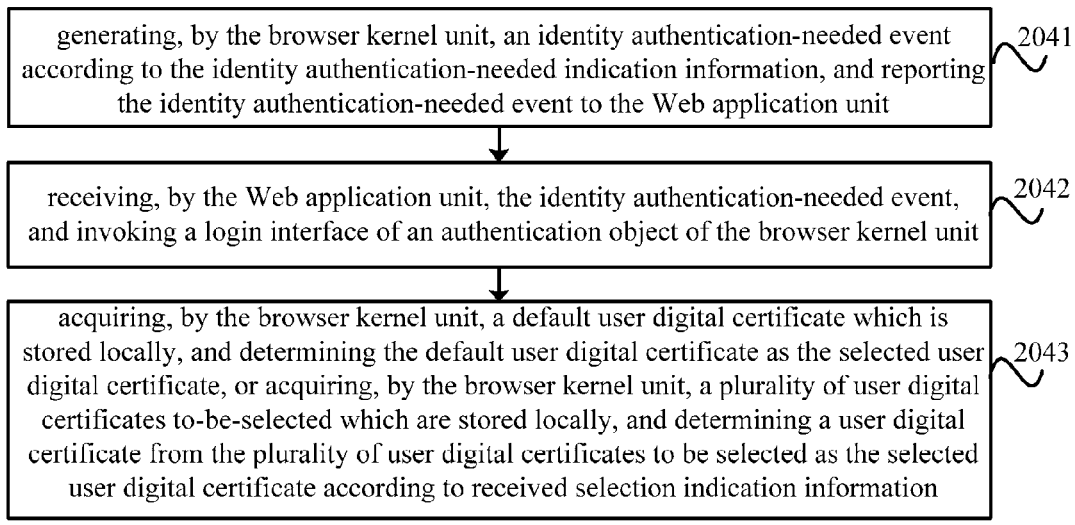
FIG. 3 is a flow chart of a method for implementing step 204 as shown in FIG. 2 according to an embodiment of the present invention.

FIG. 3 is a flow chart of a method for implementing step 204 as shown in FIG. 2. As shown in FIG. 3, in this embodiment, in step 204 of the embodiment as shown in FIG. 2, the receiving, by the browser kernel unit, the identity authentication-needed indication information returned by the application server according to the access request, and determining the selected user digital certificate according to the identity authentication-needed indication information, may specifically include the following steps, as shown in FIG. 3:

step 2041, generating, by the browser kernel unit, an identity authentication-needed event according to the identity authentication-needed indication information, and reporting the identity authentication-needed event to the Web application unit;

step 2042, receiving, by the Web application unit, the identity authentication-needed event, and invoking a login interface of an authentication object of the browser kernel unit;

Step 2043, acquiring, by the browser kernel unit, a default user digital certificate which is stored locally, and determining the default user digital certificate as the selected user digital certificate, or acquiring, by the browser kernel unit, a plurality of user digital certificates to-be-selected which are stored locally, and determining a user digital certificate from the plurality of user digital certificates to be selected as the selected user digital certificate according to received selection indication information.

Specifically, the above identity authentication-needed indication information may specifically be a transport layer security protocol (Transport Layer Security, briefly as TLS) request, the browser kernel unit receives the identity authentication-needed indication information, if the identity authentication-needed indication information carries the identity authentication constraint parameter, then parses the identity authentication constraint parameter from the identity authentication-needed indication information. Check whether the Web application unit has pre-established a monitoring to the user identity authentication event, if yes, the browser kernel unit reports the identity authentication-needed event to the Web application unit, where the identity authentication-needed event may carry the identity authentication constraint parameter.

The Web application unit receives the identity authentication-needed event, and determines that performing the identity authentication to the user is needed. Judge whether a window object in a browser DOM (Document Object Model, document object model) includes a login function sub-object, where the login function sub-object may specifically be a webID Athentication, if the window. webIDAthentication is detected, invoke a login interface provided by the authentication object in the browser kernel unit, where the authentication object may specifically be a webIDAthentication object, if the authentication object is not created, the authentication object may be created firstly, and the login interface is specifically a doLogin interface. If the identity authentication constraint parameter exists, then the identity authentication constraint parameter may be taken as a parameter and transferred into the browser kernel unit through the login interface. The Web application unit may also detect whether the identity authentication to the user is needed according to a Web application internal logic.

The doLogin interface may specifically be implemented through the following interface functions:

```
interface webIDAthentication : EventTarget {
    attribute DOMString webID;//user webID
      readonly [DC] attribute DCList;// digital certificate list
corresponding to the webID
        void doLogin(AuthContext context);//user identity authentication
          interface
        void doLogout(DOMString webID);//user logout interface
        void doQueryUserstatus(DOMString webID);//user login status
          query interface
    //callback interface
    void attribute Function? onLogin;//user identity authentication callback
       interface
    void attribute Function? onLogout; //user logout callback interface
    void attribute Function? onQueryUserstatus;//user login status query
callback interface
};
```

When the webIDAthentication::doLogin interface invoking is received by the browser kernel unit, according to a predetermined user configuration or system policy, the browser kernel unit detect whether the browser kernel unit needs to automatically select a certain user digital certificate for the user for this identity authentication. The user configuration process may specifically be: automatically selecting, by the browser kernel unit, a pre-set user digital certificate for the user, or reminding the user to select manually, when the browser kernel unit needs the user digital certificate to perform the identity authentication according to the user configuration. When the configuration is not performed by the user, the browser kernel unit may perform an operation according to the system policy, e.g., when there is only one locally-stored user digital certificate, the browser kernel unit takes the user digital certificate as a default user digital certificate and performs the identity authentication, when there are a plurality of locally-stored user digital certificates, the browser kernel unit displays all the user digital certificates to the user, so as to facilitate the user to select.

If an automatic selection needs to be performed, the browser kernel unit acquires a default user digital certificate, if the identity authentication constraint parameter is transferred into when the doLogin interface is invoked, then may also check whether the default user digital certificate meets the requirement of the identity authentication constraint parameter. By confirming to use the default user digital certificate for performing this identity authentication, an explicit interaction with the user doesn't need to be performed any more through a digital certificate manager interface, which can shorten the processing time for the overall process greatly, and improve the processing efficiency.

If an automatic selection doesn't need to be performed, the browser kernel unit acquires the plurality of user digital certificates to-be-selected to form a user digital certificate list. If the identity authentication constraint parameter is transferred into, a check and a screening may also be performed to all the managed user digital certificates according to the identity authentication constraint parameter, and an available user digital certificate list is obtained. And the digital certificate manager interface is popped up, which lists all the available user digital certificates, and prompts the user to select a certain user digital certificate for the identity authentication of this website access from the available user digital certificates. This processing method can facilitate the user to perform logins to different Web applications by using different user identities.

During the specific implementation process, the above digital certificate manager interface may be an operation interface of the digital certificate manager implemented in the browser kernel unit, if the browser kernel unit implements the digital certificate manager by itself, the browser kernel unit needs to read a digital certificate stored by the local machine and display the digital certificate in the digital certificate manager interface through a CAPICOM (Cryptographic API Component Object Model, cryptographic API component object model) interface provided by the operation system, in this implementation method, the browser may perform the reading of the user digital certificate when being started, and may also trigger the reading of the user digital certificate when processing a specific application and page, so as to provide a higher processing efficiency. The digital certificate manager may also be a digital certificate manager provided by the operation system.

If the Web application unit pre-establishes a monitoring for a user digital certificate selection event, the browser kernel unit reports the digital certificate selection event to the Web application, and transfers the user digital certificate selected by the user as a parameter to a Web application layer through a digital certificate selection event reporting interface. The Web application unit instructs the browser kernel unit to send the login request to the application server.

Step 205 is performed after step 204, generating, by the browser kernel unit and according to the selected user digital certificate, the login request carrying the selected user digital certificate, and sending the login request to the application server;

Step 206, receiving, by the browser kernel unit, a response indicating the authentication success which is returned by the application server after performing the identity authentication according to the selected digital certificate, extracting the webpage file from the response, parsing the webpage file, generating the webpage and sending the webpage to the browser interface unit;

Step 207, displaying, by the browser interface unit, the webpage.

For the specific implementation of steps 205-207 of this embodiment, reference may be made to relevant descriptions of steps 101-103 of the embodiment as shown in FIG. 1.

In Step 206 of this embodiment, after the receiving, by the browser kernel unit, the response indicating the authentication success which is returned by the application server after performing the identity authentication according to the selected digital certificate, and before the extracting, by the browser kernel unit, the webpage file from the response, the method further includes:

parsing, by the browser kernel unit, an authentication result indicating the authentication success from the response, and sending the authentication result to the Web application unit through an authentication result event or a callback function.

The browser kernel unit parses the authentication result indicating the authentication success from the response, and transfers the authentication result to the Web application unit through the manner of reporting an authentication result event or invoking a callback function. If the Web application unit pre-establishes a monitoring for the authentication result event, the browser kernel unit notifies the Web application unit of the authentication result through the manner of reporting the authentication result event, a function address does not need to be transferred and, thus, the operation efficiency is higher. If the Web application unit pre-implements a callback interface onLogin, the browser kernel unit may transfer the authentication result to the Web application unit through the manner of invoking the callback function onLogin.

Certainly, the specific process of step 207 is similar to step 103 of the embodiment as shown in FIG. 1, i.e., for the specific implementation of step 103, reference may be made to step 207.

Figure 4:
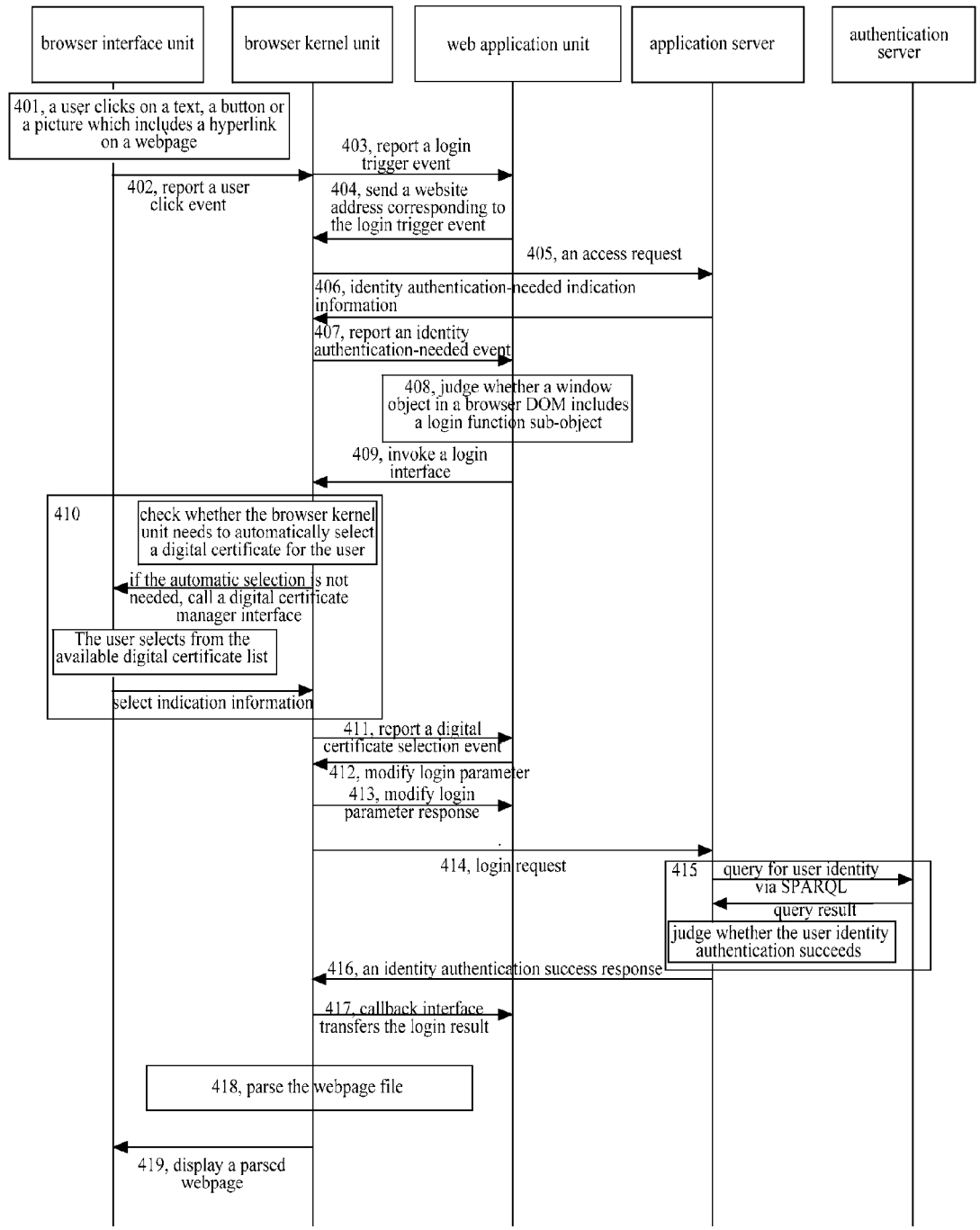
FIG. 4 is a signaling diagram of identity authentication according to an embodiment of the present invention.

FIG. 4 is a diagram of identity authentication according to an embodiment of the present invention. The method for identity authentication according to this embodiment will be illustrated in detail hereunder with reference to FIG. 4.

401, a user clicks on a text, a button or a picture which includes a hyperlink on a webpage displayed by a browser interface unit;

402, the browser interface unit reports a user click event to the browser kernel unit;

403, the browser kernel unit detects the user click event, and reports the user click event to the Web application unit as a login trigger event;

404, the Web application unit determines a website address corresponding to the login trigger event, and sends the website address to the browser kernel unit;

405, the browser kernel unit sends an access request to the application server according to the website address;

406, the application server determines that an identity authentication needs to be performed to the user, and sends identity authentication-needed indication information to the browser kernel unit, where the identity authentication indication information may carry an identity authentication constraint parameter;

407, the browser kernel unit generates an identity authentication-needed event according to the identity authentication-needed indication information, and reports the identity authentication-needed event to the Web application unit;

408, the Web application unit judges whether a window object in a browser DOM includes a login function sub-object according to the identity authentication-needed event, if the login function sub-object is detected, then performs 409;

409, invoke a login interface of an authentication object provided in the browser kernel unit;

410, the browser kernel unit checks whether the browser kernel unit needs to automatically select a digital certificate for the user, if the automatic selection is not needed, invokes a digital certificate manager interface, the user selects a user digital certificate through a user digital certificate list displayed in the browser interface unit, and sends select indication information to the browser kernel unit;

411, the browser kernel unit reports a digital certificate selection event to the Web application unit;

412, the Web application unit sends a modified login parameter to the browser kernel unit according to the digital certificate selection event;

413, the browser kernel unit returns a modified login parameter response to the Web application unit;

414, the browser kernel unit sends a login request to the application server, where the login request carries the selected user digital certificate;

415, the application server queries an authentication server via the SPARQL to obtain a user identity, receives the query result, and judges whether the user identity authentication succeeds, if successful, then performs 416, if failed, then sends an identity authentication failure response to the browser kernel unit (not shown in the figure);

416, the application server returns an identity authentication success response to the browser kernel unit, where the identity authentication success response carries a webpage file, and the webpage file may specifically be an html/css/js file;

417, the browser kernel unit transfers a login result to the Web application unit through a callback interface;

418, the browser kernel unit parses the webpage file;

419, the browser interface unit displays the parsed webpage.

In the foregoing implementation methods, the browser kernel unit performs the parsing process to both the identity authentication-needed indication information and the response sent by the application server, which may reduce the processing complexity of the Web application unit. Of course, the processing procedure for parsing the identity authentication-needed indication information and the response sent by the application server may also be implemented by the Web application unit.

Figure 5:
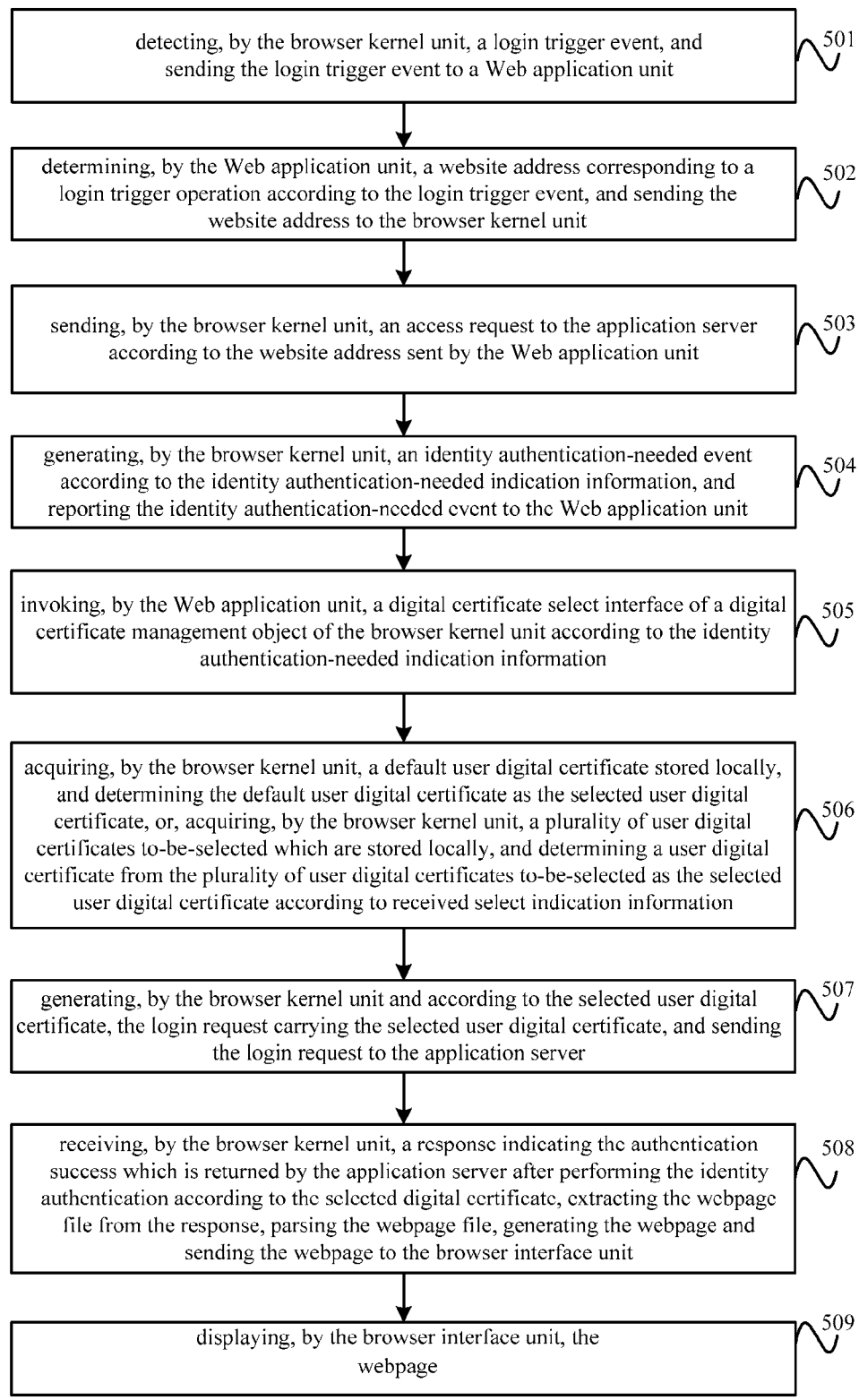
FIG. 5 is a flow chart of a third method for identity authentication according to an embodiment of the present invention.

FIG. 5 is a flow chart of a third method for identity authentication according to an embodiment of the present invention. As shown in FIG. 5, in another implementation method, the specific implementation of steps 501-503 of this embodiment may respectively refer to steps 201-203 as shown in FIG. 2, and will not be repeated herein.

This embodiment also includes step 204 of the embodiment as shown in FIG. 2, i.e., the determining, by the browser kernel unit, the selected user digital certificate according to the identity authentication-needed indication information, and may specifically include the following steps:

step 504, generating, by the browser kernel unit, an identity authentication-needed event according to the identity authentication-needed indication information, and reporting the identity authentication-needed event to the Web application unit;

step 505, invoking, by the Web application unit, a digital certificate select interface of a digital certificate management object of the browser kernel unit according to the identity authentication-needed indication information; and step 506, acquiring, by the browser kernel unit, a default user digital certificate stored locally, and determining the default user digital certificate as the selected user digital certificate, or, acquiring, by the browser kernel unit, a plurality of user digital certificates to-be-selected which are stored locally, and determining a user digital certificate from the plurality of user digital certificates to-be-selected as the selected user digital certificate according to received select indication information.

Specifically, the identity authentication-needed indication information is specifically an HTTP response. The browser kernel unit receives the identity authentication-needed indication information, reports an identity authentication-needed event to the Web application unit according to the identity authentication-needed indication information, and may specifically transfer the identity authentication-needed indication information to the Web application unit by invoking a hypertext transfer protocol request interface of the Web application unit, where the hypertext transfer protocol request interface is specifically an XMLHttpRequest interface in a Web application program architecture AJAX. The Web application unit determines that the identity authentication needs to be performed to the user according to the identity authentication-needed indication information, if an identity authentication constraint parameter exists, the Web application unit may also parse the identity authentication constraint parameter from the identity authentication-needed indication information.

Web application unit: a web application judges whether a window object in a browser DOM includes a digital certificate management sub-object, where the digital certificate management sub-object is specifically a digitalCertificateMagmt, if the window. digitalCertificateMagmt is detected, then creates a digital certificate management object, i.e., the digitalCertificateMagmt object, invokes the digital certificate select interface provided by the browser kernel unit, if the identity authentication constraint parameter exists, then may also introduce the identity authentication constraint parameter as a parameter into the browser kernel unit through the login interface, where the digital certificate select interface is specifically a selectDC interface. The Web application unit may also detect whether the identity authentication needs to be performed to the user according to a Web application internal logic.

The selectDC interface may specifically be implemented through the following interface functions:

```
interface digitalCertificateMagmt: EventTarget {
    readonly [DC]attribute DCList;
    //select a digital certificate function
    void selectDC (AuthContext context);
    //a callback function
    void attribute Function? onselectDC;//select a digital certificate
        callback function
};
```

The browser kernel unit receives the invoking to the digitalCertificateMagmt::selectDC interface, and detect whether the browser kernel unit needs to automatically select a certain digital certificate for the user for the identity authentication at this time, according to a predetermined user configuration or system policy.

If the automatic selection needs to be performed, the browser kernel unit acquires a default user digital certificate, if the identity authentication constraint parameter is introduced when the selectDC interface is invoked, then may also check whether the default user digital certificate meets requirements of the identity authentication constraint parameter. By confirming to use the default user digital certificate for performing this identity authentication, an explicit interaction with the user doesn't need to be performed any more through a digital certificate manager interface, which can shorten the processing time for the overall process greatly, and improve the processing efficiency.

If an automatic selection doesn't need to be performed, the browser kernel unit acquires the plurality of user digital certificates to-be-selected to form a user digital certificate list. If the identity authentication constraint parameter is transferred into, a check and a screening may also be performed to all the managed user digital certificates according to the identity authentication constraint parameter, and an available user digital certificate list is obtained. And the digital certificate manager interface is popped up, which lists all the available user digital certificates, and prompts the user to select a certain user digital certificate for the identity authentication of this website access from the available user digital certificates. The select indication information is namely indication information for selecting a certain user digital certificate input by the user. This processing method can facilitate the user to perform logins to different Web applications by using different user identities.

During the specific implementation process, the above digital certificate manager interface may be an operation interface of the digital certificate manager implemented in the browser kernel unit, if the browser kernel unit implements the digital certificate manager by itself, the browser kernel unit needs to read a digital certificate stored by the local machine and display the digital certificate in the digital certificate manager interface through a CAPICOM interface provided by the operation system, in this implementation method, the browser may perform the reading of the user digital certificate when being started, and may also trigger the reading of the user digital certificate when processing a specific application and page, so as to provide a higher processing efficiency. The digital certificate manager may also be a digital certificate manager provided by the operation system.

If the Web application unit pre-establishes a monitoring for a user digital certificate selection event, the browser kernel unit reports the digital certificate selection event to the Web application, and transfers the user digital certificate selected by the user as a parameter to a Web application layer through a digital certificate selection event reporting interface. The Web application unit instructs the browser kernel unit to send the login request to the application server.

For steps 501-503 of the embodiment as shown in FIG. 5, reference may be made to steps 201-203 of the embodiment as shown in FIG. 2, and for steps 507-509 of the embodiment as shown in FIG. 5, reference may be made to relevant descriptions of steps 205-207 of the embodiment as shown in FIG. 2, and will not be repeated herein.

In step 508 of this embodiment, after the receiving, by the browser kernel unit, the response indicating the authentication success which is returned by the application server after performing the identity authentication according to the selected digital certificate, and before the extracting, by the browser kernel unit, the webpage file from the response, the method further includes:

sending, by the browser kernel unit, the response to the Web application unit by invoking a hypertext transfer protocol request interface of the Web application unit;

parsing, by the Web application unit, an authentication result indicating the authentication success from the response.

The hypertext transfer protocol request interface is specifically an XMLHttpRequest interface in a Web application program architecture AJAX (Asynchronous JavaScript and XML). The browser kernel unit sends the response sent by the application server to the Web application unit by invoking the hypertext transfer protocol request interface, and the Web application unit parses the authentication result indicating the authentication success from the response.

Figure 6:
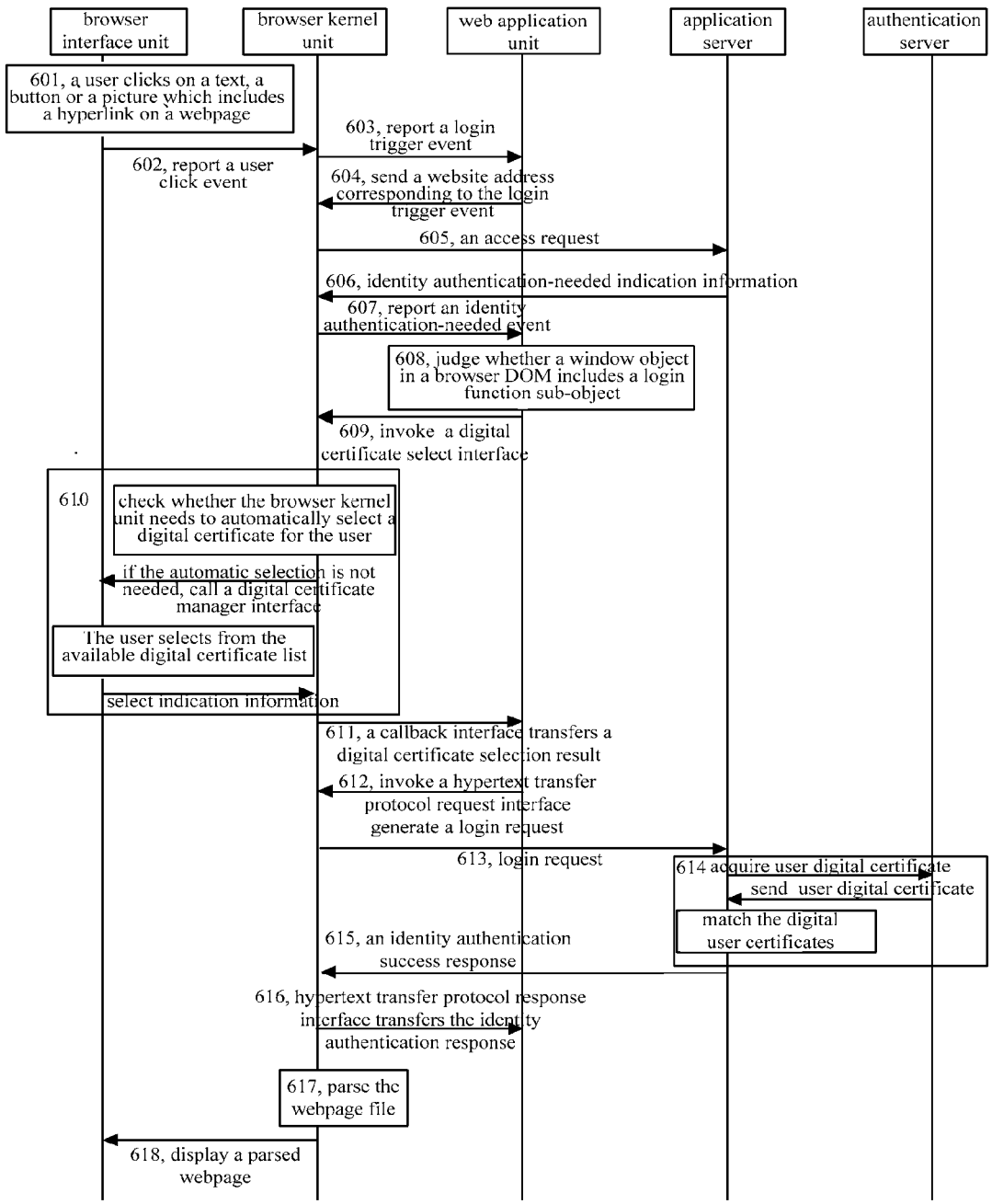
FIG. 6 is a signaling diagram of another identity authentication according to an embodiment of the present invention.

FIG. 6 is another diagram of identity authentication according to an embodiment of the present invention. The method for identity authentication according to this embodiment will be illustrated in detail hereunder with reference to FIG. 6.

601, a user clicks on a text, a button or a picture which includes a hyperlink on a webpage displayed by a browser interface unit;

602, the browser interface unit reports a user click event to the browser kernel unit;

603, the browser kernel unit detects the user click event, and reports the user click event to the Web application unit as a login trigger event;

604, the Web application unit determines a website address corresponding to the login trigger event, and sends the website address to the browser kernel unit;

605, the browser kernel unit sends an access request to the application server according to the website address;

606, the application server determines that an identity authentication needs to be performed to the user, and sends identity authentication-needed indication information to the browser kernel unit, where the identity authentication indication information may carry an identity authentication constraint parameter;

607, the browser kernel unit generates an identity authentication-needed event according to the identity authentication-needed indication information, and reports the identity authentication-needed event to the Web application unit;

608, the Web application unit judges whether a window object in a browser DOM includes a digital certificate management sub-object according to the identity authentication-needed event, if the digital certificate management sub-object is detected, then performs 609;

609, invoke a digital certificate select interface provided in the browser kernel unit;

610, the browser kernel unit checks whether the browser kernel unit needs to automatically select a digital certificate for the user, if the automatic selection is not needed, invokes a digital certificate manager interface, the user selects a user digital certificate through a user digital certificate list displayed in the browser interface unit, and sends select indication information to the browser kernel unit;

611, the browser kernel unit transfers a user digital certificate selection result to the Web application unit through a callback interface;

612, the Web application unit sends a login request to the browser kernel unit by invoking a hypertext transfer protocol request interface;

613, the browser kernel unit sends a login request to the application server, where the login request carries the selected user digital certificate;

614, the application server acquires the user's user digital certificate from an authentication server, receives a user digital certificate sent by the authentication server, and matches the user digital certificates, if the match succeeds, then performs 615, if the match fails, then returns an HTTP identity authentication failure response to the browser kernel unit (not shown in the drawing);

615, the application server returns an HTTP identity authentication success response to the browser kernel unit, where the identity authentication success response carries a webpage file, and the webpage file may specifically be an html/css/js file;

616, the browser kernel unit transfers the identity authentication success response to the Web application unit through the hypertext transfer protocol response interface;

617, the browser kernel unit parses the webpage file;

618, the browser interface unit displays the parsed webpage.

Figure 7:
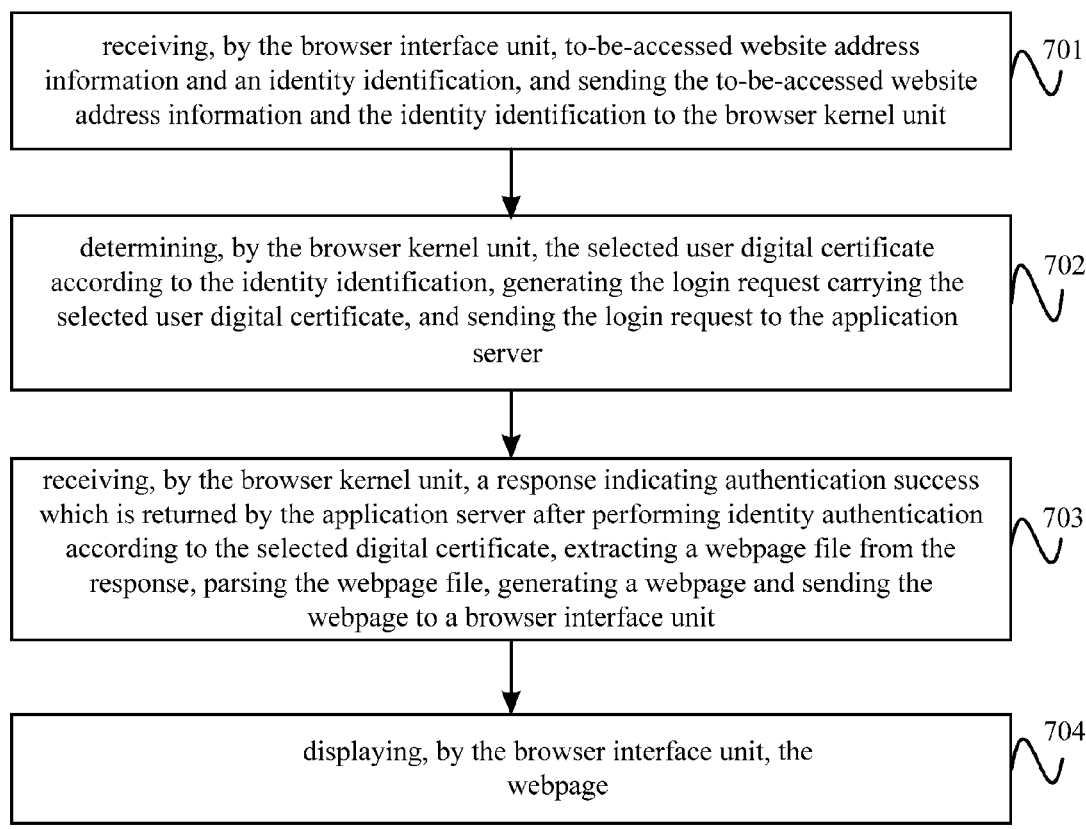
FIG. 7 is a flow chart of a fourth method for identity authentication according to an embodiment of the present invention.

FIG. 7 is a flow chart of a fourth method for identity authentication according to an embodiment of the present invention. As shown in FIG. 7, in another application scenario, a user logs in when using the Web application, in step 101 of the embodiment as shown in FIG. 1, before the generating, by the browser kernel unit, the login request carrying the selected user digital certificate according to the selected user digital certificate, and the sending the login request to the application server, the method may also further include the following steps:

step 701, receiving, by the browser interface unit, to-be-accessed website address information and an identity identification, and sending the to-be-accessed website address information and the identity identification to the browser kernel unit;

In step 101 of the embodiment as shown in FIG. 1, the generating, by the browser kernel unit, the login request carrying the selected user digital certificate according to the selected user digital certificate, and the sending the login request to the application server, may specifically include the following in this embodiment:

determining, by the browser kernel unit, the selected user digital certificate according to the identity identification, generating the login request carrying the selected user digital certificate, and sending the login request to the application server, i.e., step 702 of this embodiment.

The user inputs a website address in an address bar displayed by the browser interface unit, where the website address is namely to-be-accessed website address information, the browser interface unit provides a WebID list for the user, the user selects a WebID from the WebID list, i.e., the user hopes to access to a webpage corresponding to the website address by using a user identity corresponding to the WebID, where the WebID is namely the identity identification. The browser interface unit sends the to-be-accessed website address information and the identity identification to the browser kernel unit.

The browser kernel unit may provide an identity select interface to the user through a CAPICOM interface provided by an operation system, so as to select a digital certificate saved by a native machine. The identity select interface may also be a digital certificate manager interface corresponding to the digital certificate manager provided by the operation system.

The browser kernel unit may also automatically selects a certain user identity for the user for the identity authentication at this time according to a user configuration or a system policy, an explicit interaction with the user does not need to be performed any more through an available WebID list or the digital certificate manager interface, which can shorten the processing time for the overall process greatly, and improve the processing efficiency.

For steps 703 and 704 of this embodiment, reference may be made to relevant descriptions of steps 102 and 103 of the embodiment as shown in FIG. 1, and will not be repeated herein.

Figure 8:
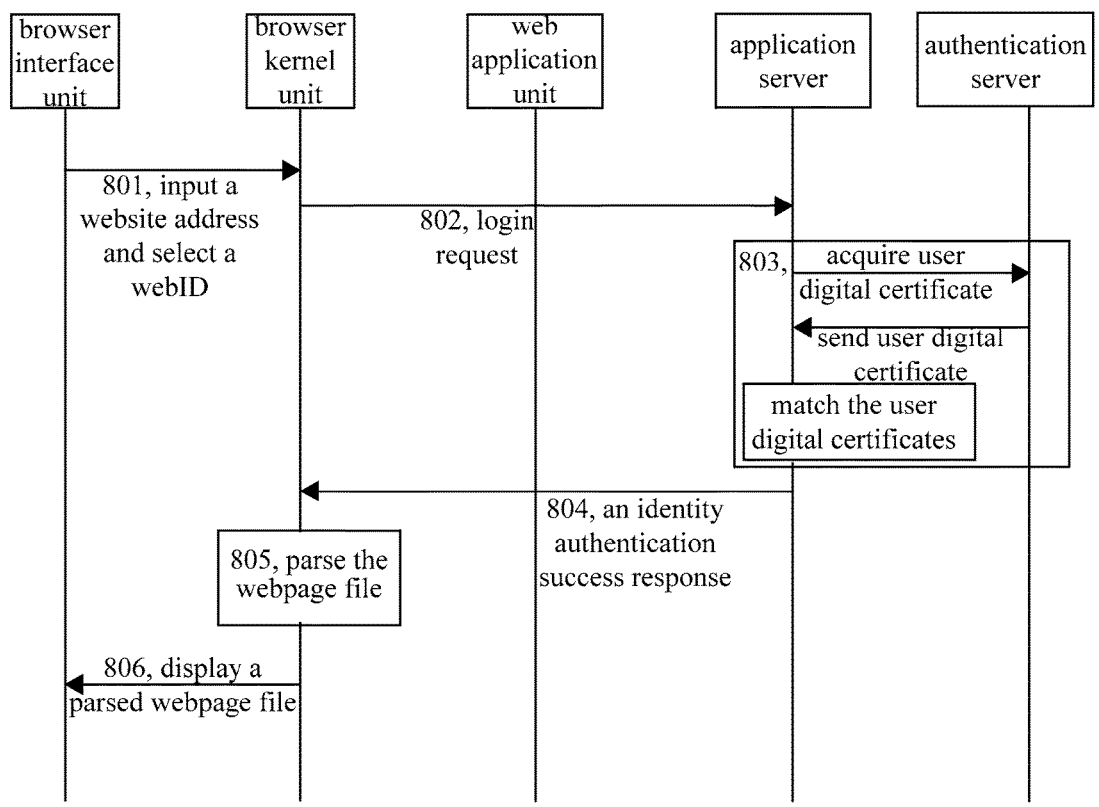
FIG. 8 is a signaling diagram of still another identity authentication according to an embodiment of the present invention.

FIG. 8 is a signaling diagram of still another identity authentication according to an embodiment of the present invention. The method for identity authentication according to this embodiment will be illustrated in detail hereunder with reference to FIG. 8.

801, the browser interface unit sends a website address and a WebID input by the user to the browser kernel unit;

802, the browser kernel unit determines a user digital certificate according to the WebID, sends a login request carrying the user digital certificate to the application server, specifically, the browser kernel may use a user private key to encrypt the website address and a time stamp, and the website address and the time stamp are carried as a parameter in the login request;

803, the application server acquires the user's user digital certificate from an authentication server, receives a user digital certificate sent by the authentication server, and matches the user digital certificates, if the match succeeds, then performs 804, if the match fails, then returns an identity authentication failure response to the browser kernel unit (not shown in the drawing), specifically, after receiving the login request, the application server uses a user public key for decryption, if the website address obtained by decryption matches with the website address that the user is accessing to, then it can be determined that the login request is issued by a browser proxy user indeed, otherwise the login request may be forged by a third party by means of a message interception;

804, the application server returns an identity authentication success response to the browser kernel unit, where the identity authentication success response carries a webpage file, and the webpage file is specifically an html/css/js file;

805, the browser kernel unit parses the webpage file;

806, the browser interface unit displays the parsed webpage.

During the process of using the Web application by the user, the user status may be detected, so as to avoid repeatedly performing an identity authentication to a user which has logged in.

Figure 9:
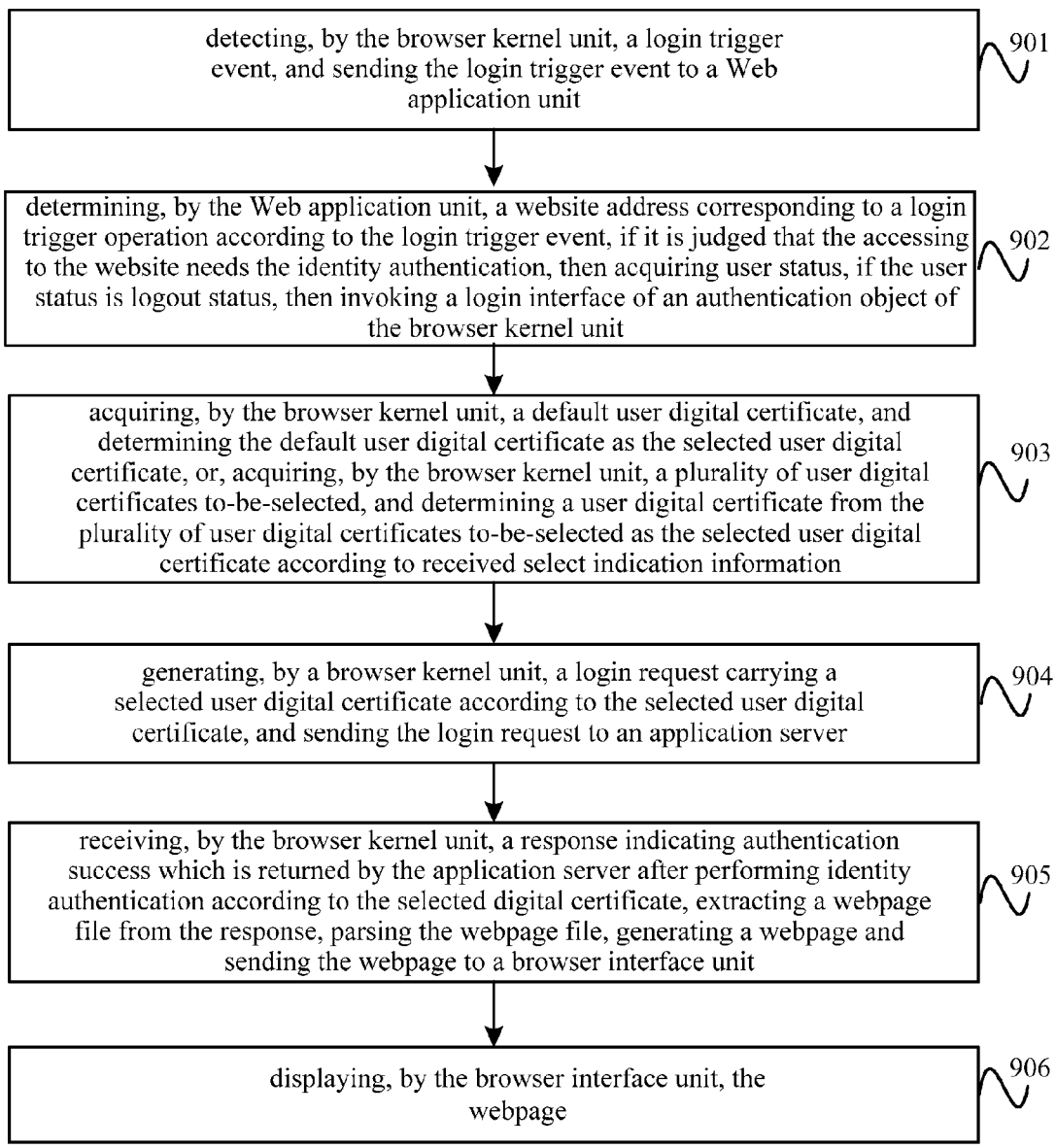
FIG. 9 is a flow chart of a fifth method for identity authentication according to an embodiment of the present invention.

FIG. 9 is a flow chart of a fifth method for identity authentication according to an embodiment of the present invention. As shown in FIG. 9, this embodiment differs from the embodiment as shown in FIG. 1 in that, before the step 101 of the embodiment as shown in FIG. 1, the generating, by the browser kernel unit, the login request carrying the selected user digital certificate according to the selected user digital certificate, the method according to this embodiment may also include the following steps:

step 901, detecting, by the browser kernel unit, a login trigger event, and sending the login trigger event to a Web application unit;

step 902, determining, by the Web application unit, a website address corresponding to a login trigger operation according to the login trigger event, if it is judged that the accessing to the website needs the identity authentication, then acquiring user status, if the user status is logout status, then invoking a login interface of an authentication object of the browser kernel unit;

Step 903, acquiring, by the browser kernel unit, a default user digital certificate, and determining the default user digital certificate as the selected user digital certificate, or, acquiring, by the browser kernel unit, a plurality of user digital certificates to-be-selected, and determining a user digital certificate from the plurality of user digital certificates to-be-selected as the selected user digital certificate according to received select indication information.

It may be judged by the Web application unit whether the identity authentication needs to be performed to the user. The Web application unit determines the website address corresponding to the login trigger operation according to the login trigger event, where, for the login trigger event, reference may be made specifically to relevant descriptions of the login trigger event in the foregoing embodiments, and will not be repeated herein. The Web application unit determines the security, importance, and privacy of network resources accessed by the user according to the website address. If it is judged that the access to the website address needs the identity authentication, and then the user status is further acquired, where the user status may be specifically the login status or the logout status. If the user status is logout status, then the Web application unit invokes the login interface of the authentication object of the browser kernel unit, for the login interface invoking process and the process of determining the selected user digital certificate by the browser kernel unit, reference may be made to relevant descriptions of the foregoing embodiments, and will not be repeated herein.

For relevant descriptions of steps 904-906 of this embodiment, reference may be made to steps 101-103 of the embodiment as shown in FIG. 1, and will not be repeated herein.

If, in step 902, the acquired user status is the login status, then in step 905, before the extracting, by the browser kernel unit, the webpage file from the response, the method further includes:

sending, by the Web application unit, the website address to the browser kernel unit;

sending, by the browser kernel unit, an access request to the application server according to the website address, and receiving a response returned by the application server according to the access request.

Specifically, if the user has logged in, then in the process of accessing the webpage by the user subsequently, the identity authentication may not be performed, the Web application unit sends the website address to the browser kernel unit directly, so that the browser kernel unit sends the access request to the application server according to the website address, after the application server receives the access request, the application server returns the response carrying the requested webpage file to the browser kernel unit.

In this embodiment, the acquiring, by the Web application unit, the user status of the user indicated by the selected user digital certificate, may specifically include the following steps:

acquiring, by the Web application unit, the user status of the user indicated by the selected user digital certificate by invoking a user login status query interface of the browser kernel unit.

The Web application may invoke the user login status query interface webIDAthentication:: doQueryUserstatus provided by the browser kernel unit, assign a to-be-queried WebID through a parameter, and acquire the current user status of the WebID. The Web application unit may pre-implement a callback interface onQueryUserstatus, and then the browser kernel unit may notify the Web application unit of the user status by means of invoking the callback function onQueryUserstatus. If the user has logged in, the user status returned by the browser kernel unit is online. If the user has not logged in, the user status returned by the browser kernel unit is offline. The Web application unit may also pre-establish a monitoring to a current login status event of the user, the browser kernel unit notifies the Web application unit of the user status by means of event reporting.

In this embodiment, the user may implement logout by clicking on a "logout" button or closing a webpage corresponding to the Web application. Specifically, the Web application unit invokes a user logout webIDAthentication:: doLogout interface provided by the browser kernel unit, and assign the to-be-logout WebID through a parameter. The browser kernel unit sends an HTTP request to the application server for user logout, and receives the HTTP response returned by the application server. The browser kernel unit parses the result of user logout from the HTTP response, the Web application unit may pre-establish a monitoring to a user logout event, the browser kernel unit notifies the Web application of the result of user logout by means of event reporting, the Web application unit may also pre-implement a callback interface onLogout, the browser kernel unit notifies the Web application of the result of user logout by means of invoking a callback function onLogout.

Figure 10:
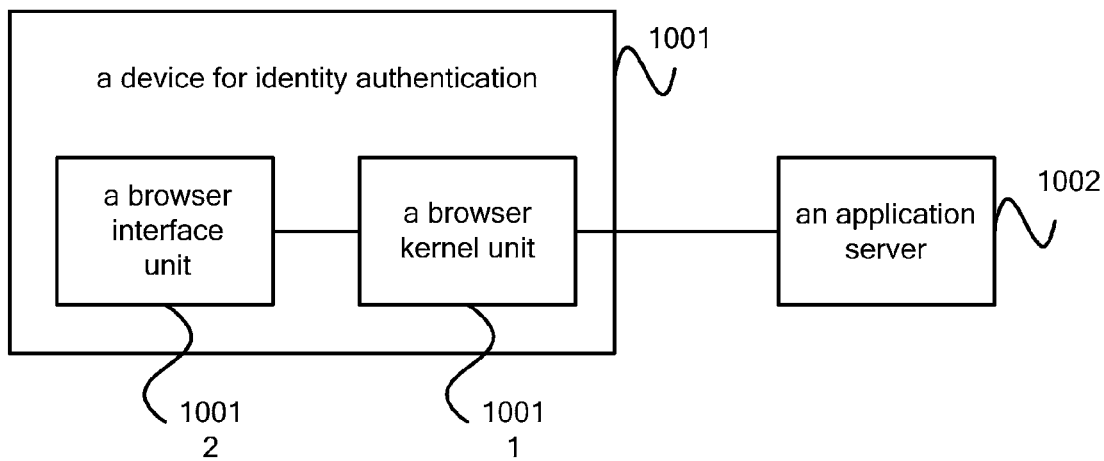
FIG. 10 is a schematic structural diagram of a system for identity authentication according to an embodiment of the present invention.

FIG. 10 is a schematic structural diagram of a system for identity authentication according to an embodiment of the present invention. As shown in FIG. 10, the system for identity authentication according to this embodiment specifically includes a device for identity authentication 1001 and an application server 1002, where the device for identity authentication 1001 may specifically implement each process of the method for identity authentication according to any embodiment of the present invention, which will not be repeated herein. The device for identity authentication 1001 according to this embodiment specifically includes a browser kernel unit 10011 and a browser interface unit 10012. The browser kernel unit 10011 is configured to, generate a login request carrying a selected user digital certificate according to the selected user digital certificate, send the login request to an application server 1002, receive a response indicating authentication success which is returned by the application server 1002 after performing the identity authentication according to the selected digital certificate, extract a webpage file from the response, parse the webpage file, generate a webpage and send the webpage to a browser interface unit 10012. The browser interface unit 10012 is configured to display the webpage.

According to the identity authentication device 1001 provided by this embodiment, a browser kernel unit 10011 generates a login request carrying a selected user digital certificate according to the selected user digital certificate, sends the login request to an application server 1002; the browser kernel unit 10011 receives a response for indicating authentication success sent by the application server 1002, extracts a webpage file from the response, parses the webpage file, generates a webpage and sends the webpage to a browser interface unit 10012; the browser interface unit 10012 displays the webpage. The identity authentication is performed through the user digital user certificate, a user does not need to remember a username and a password, thereby avoiding the interception of the password during a transmission process, and improving the convenience and security of the identity authentication.

Figure 11:
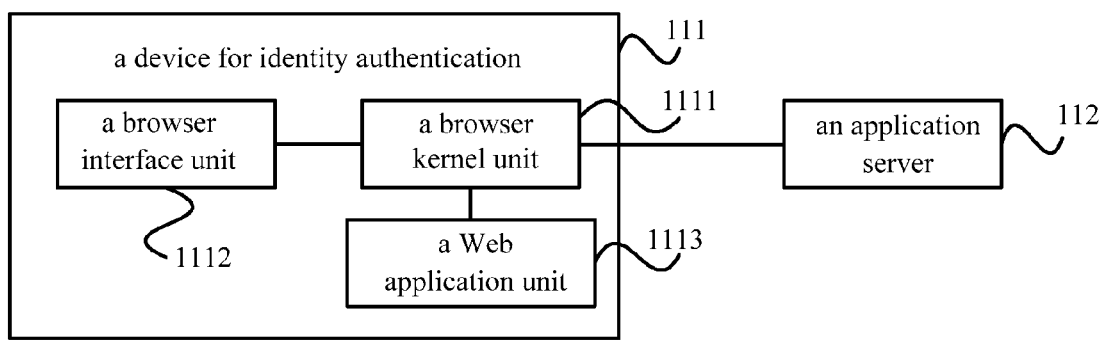
FIG. 11 is a schematic structural diagram of another system for identity authentication according to an embodiment of the present invention.

FIG. 11 is a schematic structural diagram of another system for identity authentication according to an embodiment of the present invention. As shown in FIG. 11, the identity authentication system according to this embodiment specifically includes a device for identity authentication 111 and an application server 112, where the device for identity authentication 111 according to this embodiment specifically includes a browser kernel unit 1111 and a browser interface unit 1112. In an application scenario, when a user uses the Web application through a browser, if the accessed network resources do not need identity authentication, the user does not need to login. If the network resources accessed by the user need identity authentication, then providing a user digital certificate by the user is needed, so as to perform the identity authentication. When the user clicks on a text, a button, or a picture which includes a hyperlink on the webpage displayed by the browser interface unit 1112, a user click event will be generated. In this embodiment, the difference between this embodiment and the embodiment as shown in FIG. 10 is that, the device for identity authentication 111 according to this embodiment further includes: a Web application unit 1113. The browser interface unit 1112 is further configured to detect a login trigger event, send the login trigger event to the Web application unit 1113, and send an access request to the application server 112 according to the website address sent by the Web application unit 1113, receive information requiring identity authentication returned by the application server 112 according to the access request, and determine the selected user digital certificate according to the identity authentication-needed indication information. The Web application unit 1113 is configured to determine a website address corresponding to a login trigger operation according to the login trigger event, and send the website address to the browser kernel unit 1111.

In this embodiment, the browser kernel unit 1111 is further configured to generate an identity authentication-needed event according to the identity authentication-needed indication information, report the identity authentication-needed event to the Web application unit 1113, acquire a default user digital certificate which is stored locally, and determine the default user digital certificate as the selected user digital certificate; or the browser kernel unit 1111 is further configured to acquire a plurality of user digital certificates to-be-selected which are stored locally, and determine a user digital certificate from the plurality of user digital certificates to-be-selected as the selected user digital certificate according to received selection indication information. The web application unit 1113 is further configured to receive the identity authentication-needed event, and invoke a login interface of an authentication object of the browser kernel unit 1111.

In this embodiment, the browser kernel unit 1111 is further configured to parse an authentication result indicating an authentication success from the response, and send the authentication result to the Web application unit 1113 through an authentication result event or a callback function.

In the foregoing implementation methods, the browser kernel unit 1111 performs a parsing process to both the identity authentication-needed indication information and the response sent by the application server 112, which may reduce the processing complexity of the Web application unit 1113. Of course, the processing procedure for parsing the identity authentication-needed indication information and the response sent by the application server 112 may also be implemented by the Web application unit 1113. Then, in another implementation method:

The browser kernel unit 1111 is further configured to generate an identity authentication-needed event according to the identity authentication-needed indication information, report the identity authentication-needed event to the Web application unit 1113, acquire a default user digital certificate which is stored locally, and determine the default user digital certificate as the selected user digital certificate; or the browser kernel unit 1111 is further configured to acquire a plurality of user digital certificates to-be-selected which are stored locally, and determine a user digital certificate from the plurality of user digital certificates to-be-selected as the selected user digital certificate according to received selection indication information. The Web application unit 1113 is further configured to invoke a digital certificate selection interface of a digital certificate management object of the browser kernel unit 1111 according to the identity authentication-needed indication information.

In this embodiment, the browser kernel unit 1111 is further configured to send the response to the Web application unit 1113 by invoking a hypertext transfer protocol request interface of the Web application unit 1113. The Web application unit 1113 is further configured to parse an authentication result indicating an authentication success from the response.

In another application scenario, a user logs in when using the Web application, the user inputs a website address in an address bar displayed by the browser interface unit 1112, where the website address is namely to-be-accessed website address information, the browser interface unit 1112 provides a WebID list for the user, so that the user performs a WebID selection. In this embodiment, the browser interface unit 1112 is further configured to receive to-be-accessed website address information and an identity identification, and send the to-be-accessed website address information and the identity identification to the browser kernel unit 1111. The browser kernel unit 1111 is further configured to determine the selected user digital certificate according to the identity identification, generate the login request carrying the selected user digital certificate, and send the login request to the application server 112.

During the process of using the Web application by the user, the user status may be detected, so as to avoid repeatedly performing an identity authentication. In this embodiment, the browser kernel unit 1111 is further configured to detect a login trigger event, send the login trigger event to a Web application unit 1113, acquire a default user digital certificate which is stored locally, and determine the default user digital certificate as the selected user digital certificate, or, the browser kernel unit 1111 is further configured to acquire a plurality of user digital certificates to-be-selected which are stored locally, and determine a user digital certificate from the plurality of user digital certificates to-be-selected as the selected user digital certificate according to received select indication information. The Web application unit 1113 is further configured to determine a website address corresponding to a login trigger operation according to the login trigger event, if it is judged that the accessing to the website needs the identity authentication, then acquire user status of a user indicated by the selected user digital certificate, if the user status is logout status, then invoke a login interface of an authentication object of the browser kernel unit 1111.

In this embodiment, if the user status is login status, then the Web application unit 1113 is further configured to send the website address to the browser kernel unit 1111. The browser kernel unit 1111 is further configured to send an access request to the application server 112 according to the website address, and receive a response returned by the application server 112 according to the access request.

In this embodiment, the Web application unit 1113 is further configured to acquire the user status of the user indicated by the selected user digital certificate by invoking a user login status query interface of the browser kernel unit 1111.

The device for identity authentication according to this embodiment may be specifically a device such as a personal computer, a notebook, a tablet computer, a smart phone, and the like, which is provided with a processor and a memory, the device for identity authentication is provided with a browser and an application program. Related instructions of both the browser and the application program are stored in the memory, the processor invokes the related instructions in the memory and performs the related instructions, so as to generate the final display interface which is displayed through a displayer of the device for identity authentication, and achieve functions of the browser kernel unit, the browser display unit, and the Web application unit respectively.

Persons skilled in the art can understand that all or a part of the steps of the methods according to embodiments of the present invention may be implemented by a program instructing relevant hardware, where, the program may be stored in a computer readable storage medium. When the program runs, the steps of the methods according to the foregoing embodiments are performed; the storage medium described above includes: the media of an ROM, an RAM, a disk, or a CD, and the like, which may store a program code.

Finally, it should be noted: the foregoing embodiments are merely used to illustrate the technical solutions of the present invention, and should not be considered as a limitation thereof; although detailed descriptions are given to the present invention with reference to the foregoing embodiments, persons of ordinary skill in the art should understand: they can still make modifications to the technical solutions recited in each individual embodiment described above, or make equivalent replacements to parts of technical features thereof; while these modifications or replacements do not make the nature of corresponding technical solutions depart from the scope of embodiments of the present invention.

What is claimed is:

1. A method, comprising:
   detecting, by a browser application executed by a processor, a login trigger event, and sending the login trigger event to a Web application executed by the processor;
   determining, by the Web application, a website address corresponding to a login trigger operation according to the login trigger event, and sending the website address to the browser application;
   sending, by the browser application, an access request to an application server according to the website address sent by the Web application;
   receiving, by the browser application, identity authentication-needed indication information returned by the application server according to the access request, and determining a selected user digital certificate according to the identity authentication-needed indication information;
   generating, by the browser application, a login request carrying the selected user digital certificate, and sending the login request to the application server;
   receiving, by the browser application, a response indicating authentication success that is returned by the application server after the application server performs identity authentication according to the selected user digital certificate;
   parsing, by the browser application, an authentication result indicating the authentication success from the response, and sending the authentication result to the Web application through an authentication result event or a callback function;
   extracting, by the browser application, a webpage file from the response, parsing the webpage file, and generating a webpage; and
   displaying, by the browser application, the webpage.

2. The method according to claim 1, wherein the receiving, by the browser application, the identity authentication-needed indication information returned by the application server according to the access request, and the determining the selected user digital certificate according to the identity authentication-needed indication information comprises:
   generating, by the browser application, an identity authentication-needed event according to the identity authentication-needed indication information, and reporting the identity authentication-needed event to the Web application;

receiving, by the Web application, the identity authentication-needed event, and invoking a login interface of an authentication object of the browser application; and acquiring, by the browser application:
   a default user digital certificate that is stored locally, and determining the default user digital certificate as the selected user digital certificate; or,
   a plurality of user digital certificates to-be-selected that are stored locally, and determining a user digital certificate from the plurality of user digital certificates to-be-selected as the selected user digital certificate according to received selection indication information.

3. A device, comprising:

a processor; and a non-transitory computer-readable storage medium coupled to the processor and storing programming instructions for execution by the processor, the programming instructions instruct the processor to execute a web application and a browser application;

wherein the Web application is configured to determine a website address corresponding to a login trigger operation according to a login trigger event, and send the website address to the browser application; and wherein the browser application is configured to:
   detect the login trigger event,
   send the login trigger event to the Web application,
   send an access request to an application server according to the website address sent by the Web application,
   receive identity authentication-needed indication information returned by the application server according to the access request,
   determine a selected user digital certificate according to the identity authentication-needed indication information,
   generate a login request carrying the selected user digital certificate,
   send the login request to the application server,
   receive a response indicating authentication success that is returned by the application server after the application server performs identity authentication according to the selected user digital certificate,
   parse an authentication result indicating the authentication success from the response,
   send the authentication result to the Web application through an authentication result event or a callback function,
   extract a webpage file from the response, parse the webpage file, and generate a webpage, and
   display the webpage.

4. The device according to claim 3, wherein the browser application is further configured to:
   generate an identity authentication-needed event according to the identity authentication-needed indication information, report the identity authentication-needed event to the Web application, acquire a default user digital certificate that is stored locally, and determine the default user digital certificate as the selected user digital certificate; or
   acquire a plurality of user digital certificates to-be-selected that are stored locally, and determine a user digital certificate from the plurality of user digital certificates to-be-selected as the selected user digital certificate according to received selection indication information;

and wherein the Web application is further configured to receive the identity authentication-needed event, and invoke a login interface of an authentication object of the browser application.

5. A method, comprising:

detecting, by a browser application, a login trigger event, and sending the login trigger event to a Web application;

determining, by the Web application, a website address corresponding to a login trigger operation according to the login trigger event, and sending the website address to the browser application;

sending, by the browser application, an access request to an application server according to the website address sent by the Web application;

receiving, by the browser application, identity authentication-needed indication information returned by the application server according to the access request, and determining a selected user digital certificate according to the identity authentication-needed indication information;

generating, by the browser application, a login request carrying the selected user digital certificate, and sending the login request to the application server;

receiving, by the browser application, a response indicating authentication success that is returned by the application server after the application server performs identity authentication according to the selected user digital certificate;

sending, by the browser application, the response to the Web application by invoking a hypertext transfer protocol request interface of the Web application;

parsing, by the Web application, an authentication result indicating the authentication success from the response;

extracting, by the browser application, a webpage file from the response, parsing the webpage file, and generating a webpage; and displaying, by the browser application, the webpage.

6. The method for identity authentication according to claim 5, wherein, the receiving, by the browser application, the identity authentication-needed indication information returned by the application server according to the access request, and the determining the selected user digital certificate according to the identity authentication-needed indication information comprises:

generating, by the browser application, an identity authentication-needed event according to the identity authentication-needed indication information, and reporting the identity authentication-needed event to the Web application;

calling, by the Web application, a digital certificate selection interface of a digital certificate management object of the browser application according to the identity authentication-needed indication information; and acquiring, by the browser application:
   a default user digital certificate that is stored locally, and determining the default user digital certificate as the selected user digital certificate; or
   a plurality of user digital certificates to-be-selected that are stored locally, and determining a user digital certificate from the plurality of user digital certificates to-be-selected as the selected user digital certificate according to received selection indication information.

7. A device, comprising:
a processor; and
a non-transitory computer-readable storage medium coupled to the processor and storing programming instructions for execution by the processor, the programming instructions instruct the processor to execute a web application and a browser application:
wherein the Web application is configured to:
   determine a website address corresponding to a login trigger operation according to a login trigger event, and
   send the website address to the browser application;
wherein the browser application is configured to:
   detect the login trigger event,
   send the login trigger event to the Web application,
   send an access request to an application server according to the website address sent by the Web application,
   receive identity authentication-needed indication information returned by the application server according to the access request,
   determine a selected user digital certificate according to the identity authentication-needed indication information,
   generate a login request carrying the selected user digital certificate,
   send the login request to the application server,
   receive a response indicating authentication success that is returned by the application server after the application server performs identity authentication according to the selected user digital certificate,
   send the response to the Web application by invoking a hypertext transfer protocol request interface of the Web application,
   extract a webpage file from the response, parse the webpage file, and generate a webpage, and
   display the webpage; and
wherein the Web application is further configured to:
   parse an authentication result indicating the authentication success from the response.

8. The device according to claim 7,
wherein the browser application is further configured to:
   generate an identity authentication-needed event according to the identity authentication-needed indication information, report the identity authentication-needed event to the Web application, acquire a default user digital certificate that is stored locally, and determine the default user digital certificate as the selected user digital certificate; or,
   acquire a plurality of user digital certificates to-be-selected that are stored locally, and determine a user digital certificate from the plurality of user digital certificates to-be-selected as the selected user digital certificate according to received selection indication information; and
wherein the Web application is configured to invoke a digital certificate selection interface of a digital certificate management object of the browser application according to the identity authentication-needed indication information.

* * * * *

UNITED STATES PATENT AND TRADEMARK OFFICE
CERTIFICATE OF CORRECTION

PATENT NO. : 9,628,461 B2  
APPLICATION NO. : 14/409300  
DATED : April 18, 2017  
INVENTOR(S) : Li et al.

Page 1 of 1

It is certified that error appears in the above-identified patent and that said Letters Patent is hereby corrected as shown below:

On the Title Page

Item (12), "Ll et al." should read -- Li et al. --.

Item (72), inventor name "Li Ll" should read -- Li Li --.

Item (72), city and country for inventor Li Li should read -- Shenzhen (CN) --.

Item (72), city and country for inventor Lixin Hu should read -- Shenzhen (CN) --.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*